United States Patent Office 3,823,008
Patented July 9, 1974

3,823,008
HERBICIDAL COMPOSITIONS AND THEIR USE
Keith Carpenter, Beauchamp Roding, near Ongar, Basil Jason Heywood, Hornchurch, and Edgar William Parnell, Romford, England, and Jean Metivier, Paris, and Roger Boesch, Vitry-sur-Seine, France, assignors to May & Baker Limited, Essex, England
No Drawing. Continuation-in-part of application Ser. No. 548,020, May 5, 1966, which is a continuation-in-part of applications Ser. No. 223,286 and Ser. No. 223,288, both Sept. 4, 1962, all now abandoned. This application Nov. 13, 1970, Ser. No. 89,434
Int. Cl. A01n 9/14
U.S. Cl. 71—103    34 Claims

ABSTRACT OF THE DISCLOSURE

The invention provides a method for controlling weeds in certain valuable crops e.g. of flax, linseed, lucerne, peas or beans, potatoes, or sugar cane, and in non-crop areas, by applying to said weeds a sulphonylcarbamic ester of the formula:

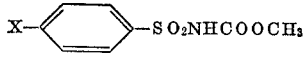

wherein X is nitro, primary amino, methylamino, N-methylformylamino, or methoxycarbonylamino, or a salt thereof.

---

This Application is a Continuation-in-Part of our Application Serial No. 548,020, filed May 5th, 1966, itself a Continuation-in-Part of our Applications Serial Nos. 223,286, filed September 4th, 1962, and 223,288, filed September 4th, 1962, all now abandoned.

This invention relates to herbicides and their use.

It has been discovered that certain sulphonylcarbamic esters and their water-soluble salts, including their alkali metal salts, for example their sodium and potassium salts, and their ammonium and amine salts, have valuable selective herbicidal properties. The sulphonylcarbamic esters have the general formula:

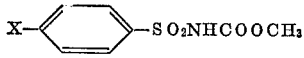

wherein X represents nitro, primary amino, methylamino, N-methylformylamino or methoxycarbonylamino. It is to be understood that where, in this specification, reference is made to the sulphonylcarbamic esters, it is intended to refer also to their water-soluble salts where the context so permits.

The sulphonylcarbamic esters of general formula I (including, as already stated, their water-soluble salts) have valuable herbicidal properties. They appear to interfere with vital growing processes in susceptible plants, which are ultimately killed by a slow systemic action. The plants become chlorotic, and often bright yellow; they fail to make new growth and finally die up to 5 or 6 weeks after treatment, or remain so seriously arrested as to be incapable of recovery. The herbicides may be applied either to the foliage of the plants, or to the soil in which the roots of the plants grow. Application to soil also prevents development of seedlings upon germination. Thus, the new herbicides may be used for both pre- and post-emergence applications.

Moreover, the new herbicides have a valuable selective effect. In particular, they are well tolerated at application rates giving useful control of weeds by certain economically important crops including flax and linseed (*Linum usitatissimum*), and lucerne (*Medicago sativa*) by post-emergence application, peas (*Pisum sativum*), broad beans (*Vicia faba*), French beans (*Phaseolus vulgaris*) and sugar beet by pre-emergence application and potatoes (*Solanum tuberosum*) and sugar cane (*Saccharum officinarum*) by both pre- and post-emergence application. The compounds in which X represents nitro, primary amino or methoxy carbonyl amino are also well tolerated by established bushcrops including blackcurrents (*Ribes nigrum*) and raspberries (*Rubus idaeus*) and orchard crops including apples. In addition, compounds of this class are substantially without deleterious effect on important crop grass species, in particular *Lolium* species in post-emergence application. The compound in which X represents primary amino is, in addition to being well tolerated by orchard crops, well tolerated when applied in other tree-growing areas, including citrus crops, nut crops, e.g. crops of peacn and walnuts, and stands of young timber, both of hard and soft wood, for example of oak (*Quercus sp.*), spruce (*Picea sp.*), firs (*Abies sp.*), and pines, e.g. *Pinus sylvestris* (Scots Pine) and *Pinus nigra* var. *calabrica* (Corsican Pine) and to pastures. The compounds in which X represents primary amino is also well tolerated by members of the *Cucurbit* family, e.g. cucumbers and melons. The compounds of formula I in which X represents methoxycarbonylamino, methylamino or N-methyl-formylamino are substantially without deleterious effect on crops of tomatoes and cotton on post-emergence application and the compounds in which X represents methylamino or N-methyl-formylamino are also well tolerated by crops of soya bean and tobacco on post-emergence application.

Weeds which can be controlled by the new herbicides by both pre- and post-emergence application include such important species as *Avena fatua* (wild oats), *Poa annua* (annual meadow grass), *Poa trivialis*, *Holcus* species, *Bromus* species, *Sinapis arvensis* (charlock), *Polygonum* species, *Alopecurus* species, *Rumex* species, *Digitaria sanguinalis* (Crabgrass), *Echinochloa crus-galli*, *Eleusine indica* (Goosegrass), *Agrostis* species and *Setaria viridis* (Green Foxtail). The compounds in which X represents nitro, primary amino or methoxycarbonylamino are, in addition, highly active against *Stellaria media* (Chickweed) by pre- and post-emergence application, against *Chenopodium album* (Fat Hen) and *Amaranthus* species by pre-emergence application and as is also the compound in which X represents methylamino, against *Capsella bursa-pastoris* (Shepherd's Purse) and *Veronica* species by post-emergence application. In addition, the compounds in which X represents nitro or primary amino are highly active against *Chrysanthemum segetum* (Corn Marigold), *Matricaria inodora* (Mayweed), *Thalaspi arvense* and *Senecio vulgaris* (Groundsel) by pre- and post-emergence application and the compound in which X represents methylamino is highly active against *Chrysanthemum segetum*, *Matricaria inodora*, and *Thalaspi arvense* by pre- and post-emergence application and may also be used to control *Senecio vulgaris* by pre-emergence application.

The compounds in which X represents primary amino and nitro are also highly active against *Sorghum* spp., e.g. *S. haepense*, *S. sudannensis* and *S. verticilliflorum*, *Agropyron* spp., e.g. *A. repens* and *A. smithiae Leptochloa filiformis*, *Panicum* spp., e.g. *P. adspersum*, *P. dichotomiflorum*, *P. repens* and *P. fasciculatum*, *Digitaria* spp., e.g. *D. sanguinalis* and *D. procumbens*, *Echinochloa colanum*, *Eleusine africana*, *Cynodon dactylon*, *Rottboellia exaltata*, *Cenchrus echinatus* and *Portulaca oleracea*, by both pre- and post-emergence application, *Equisetum* spp., e.g. *E. arvense* and *Pteridium aquilinum* by post-emergence application, *Alternanthera sessilis*, *Phyllanthus amarus*, *Syndrella modiflora*, *Teramnus labialis*, *Commelina elegans*, *Cleone ciliata* and *Amaranthus* spp., e.g. *A. viridans* by both pre- and post-emergence application, *Euphorbia* spp., e.g. *E. geniculata* and *E. hirta*, *Mucuna pruriens*, *Parthenium hysterophorum*, and *Phaseolus lathyroides* by pre-emergence application and *Brachiaria* spp., e.g. *B. mutica, B. eruciformis* and *B. platyphylla, Emelia sonchifolia, Emilista tora, Momordica charanta, Physalis turbinata, Andropogon* spp., and *Wedelia gracilis* by post-emergence application.

The rate of application of the sulphonylcarbamic ester of the invention and the mode and time of application, vary with the nature of the crop to be treated and the weeds to be controlled, as well as with the effect it is desired to obtain. However, in general, an application rate of 1 to 10 lbs. per acre gives good results, and, as indicated above, the treatment can take place before or after the crop emerges. In appropriate cases, e.g. the removal of weeds from orchards, the herbicide may be directed at the soil areas containing the weeds only, and substantially none of it allowed to touch the economically valuable crop.

The compounds of formula I in which X is primary amino is useful in the control of weeds in the cultvation of sugar-cane. With this crop, it is important to control the growth of competitive weeds during the early growth stages of the cane before it grows tall enough effectively to cover the whole crop area, thereby shading the weeds and preventing their further development. Moreover, reduction of the weed population between the rows of cane makes the latter easier to harvest. It has been found that the application of methyl *para*-aminobenzenesulphonylcarbamate, as its potassium salt, at a rate of 3.5 kilograms per hectare (about 3.1 lbs. per acre), in solution in 440 litres of water, 11 days after planting, gives good control of the weeds which normally occur with sugar-cane, e.g. *Sporobulus indicus, Phyllanthus niruri, Cyperus rotundus, Euphorbia* species, *Widelia gracilis, Cynodon dactylon,* and *Physalis* species. The control lasts for up to 56 days, the proportion of the crop area covered at the end of that time by grass weeds being about 4% and that covered by broad leafed weeds being about 10%. In contrast, unsprayed control crop areas are covered to the extent of about 25% by grass weeds and 25% by broad leafed weeds at the end of the same period. Even after 70 days, grass weeds only cover about 3% of the crop area, in the treated plots, although in untreated plots the area covered by grass weeds at this stage was about 35% of the crop area. The sugar-cane showed no evidence of damage at any stage, and its development was normal. In an alternative procedure, which has also been found to be useful, the crop of sugar-cane is sprayed after the cane has reached a height of about 18 inches with a mixture of methyl *para*-aminobenzenesulphonyl carbamate, as the free acid, and 2,4-dichlorophenoxyacetic acid, as the isooctyl ester. At the time of spraying, two weeds, viz. *Cleone ciliata* and *Mimosa pudica*, had already emerged, and experience suggested that others would emerge later. Good control of all kinds of weeds was obtained until the sugar-cane had completely closed over the rows about 60 days after spraying. By contrast, unsprayed control plots at this stage were covered to the extent of 95% of the crop area with weeds, about 55% being broad leafed weeds and 40% grasses. The species present included *Cleone siliata, Mimosa pudica, Portulaca oleracea, Euphorbia species, Cyperus rotundus, Cynodon dactylon, Helitropium indicum,* and John's grass. The figures for the treated plots were as follows: (a) a plot treated with the aforesaid octyl ester only at a dosage rate of 0.98 kilograms per hectare (calculated as free acid) was covered to the extent of 65% of the crop area, 30% being grasses; (b) the plot sprayed with 3.36 kilograms per hectare of methyl para-aminobenzenesulphonylcarbamate (as the free acid) and 0.98 kilograms per hectare of 2,4-dichlorophenoxy acetic acid (as the iso-octyl ester), was covered to the extent of 45% of the crop area, 15% being grasses; and (c) the plot treated with 4.48 kilograms per hectare of methyl *para*-aminobenzenesulphonyl carbamate (as the free acid), and 0.98 kilograms per hectare (free acid equivalent) of 2,4-dichlorophenoxyacetic acid (as the isooctyl ester), was covered with weeds to the extent of only 10%, 3% being grasses. As already stated, the sugar-cane was not damaged by the treatment. It has also been found that the post-emergence application of methyl *para*-aminobenzenesulphonylcarbamate, as its sodium salt, at a rate of 3 lbs. per acre gives good (greater than 85%) control of established *Sorghum halepense* (Johnsongrass), a particularly important and troublesome weed, in emerged sugar-cane without causing any visible signs of injury to the sugar-cane. Good control is maintained for at least six months after application of the herbicide.

Methyl *para*-aminobenzenesulphonylcarbamate has also been found to be useful, both alone and in combination with 4-hydroxy-3,5-diiodobenzonitrile, in the control of weeds in potato crops. This compound is especially useful in control of *Rumex* species, for example in orchards and pastures.

The new herbicides may also be used to control the growth of weeds, especially those indicated above, at loci which are not crop-growing areas, but in which the control of weeds, or at least of the more important weeds, is, nevertheless, desirable. Examples of such non-crop-growing areas include airfields, industrial sites, railways, roadside verges, the verges of rivers, irrigation canals and other waterways, forests, woodlands and scrub, in particular where it is desired to control the growth of weeds in order to reduce fire risks, and fallow or uncultivated agricultural land. While the compounds will not necessarily control all the weed species to be found in a given situation, there are some species which by virtue of their aggressive and perennial nature dominate the loci in which they occur and warrant the use of a specific means of control. Examples are *Sorghum halepense, Pteridium aquilinum* and *Rumex* species, which are not adequately controlled at economically acceptable application rates by herbicides normally used in such situations for general weed control. The compound in which X represents primary amino is especially valuable for these purposes because of its high activity, its translocation into the underground root system and the persistance of its herbicidal effects. Application rates of 2 to 4 lbs. per acre of this compound are particularly suitable but lower or higher, e.g. up to 6 lbs. per acre, may be used according to the particular problem of weed control encountered. The compound is particularly useful in the control in non-crop-growing areas of *Sorghum halopense* and *Pteridium aquilinum* (bracken) and *Rumex* species.

According to a feature of the invention, herbicidal compositons contain one or more sulphonylcarbamic esters as hereinbefore defined in association with at least one compatible solid diluent or a compatible mineral, animal or vegetable oil suitable for use in herbicidal compositions, or contain one or more of the sulphonylcarbamic esters as hereinbefore defined in association with at least one compatible liquid diluent suitable for use in herbicidal compositions (other than a mineral animal or vegetable oil) and a wetting, dispersing or emulsifying agent. The herbicidal compositions in which the sulphonylcarbamic ester is associated with a solid diluent or a mineral, animal or vegetable oil preferably also contain a wetting, dispersng or emulsifying agent. Preferably, the compositions contain 0.05 to 50% by weight of the sulphonylcarbamic ester, when they are designed to be applied without dilution, and 5 to 95% by weight when designed to be diluted before application. Where the sulphonhylcarbamic esters of formula I are to be applied by spraying in post-emergence application, it is preferred to use them as their water-soluble salts, while when they are to be used for pre-emergence application, both the water-soluble salts and the sparingly soluble free acids can conveniently be used. The latter may be formulated as concentrated dispersable powders containing, for example, 80% of active ingredient in association with a small amount of inert diluent and dispersing agent.

Examples of suitable solid diluents are talc, calcined magnesia, kieselguhr, tricalcium phosphate, powdered cork, absorbent carbon black, a clay such as kaolin or bentonite or a compatible solid wetting or dispersing agent. The solid compositions, which may take the form of dusts, granules or wettable powders, are preferably prepared by grinding the sulphonylcarbamic esters of formula I with the solid diluents or by impregnating the solid diluents with solutions of the sulphonylcarbamic esters in volatile solvents, evaporating the solvents and, if necessary, grinding the products so as to obtain powders. Granular formulations may be prepared by absorbing the sulphonylcarbamic esters dissolved in volatile solvents onto the solid diluents in granular form and evaporating the solvents or by granulating compositions in powder form obtained as described above. The wetting, dispersing or emulsifying agents which are preferably present, particularly in wettable powders, may be of the ionic or non-ionc type, for example sulphoricinoleates, quaternary ammonium derivatives, or products based on condensates of ethylene oxide, such as condensates of ethylene oxide with octylphenol, or fatty acid esters of anhydrosorbitols which have been rendered soluble by etherification of the free hydroxy groups by condensation with ethylene oxide. Wettable powders according to the present inventon may be treated with water immediately before use to give solutions or suspensions ready for application.

Liquid compositions according to the invention may take the form of solutions, suspensions or emulsions of the sulphonylcarbamic esters incorporating a wetting, dispersing or emulsifying agent. These emulsions and solutions are formed in aqueous, organic or aqueous-organic media such as acetophenone, isophorone, toluene or xylene or mineral, animal or vegetable oils (or mixtures of these diluents), containing wetting, dispersing or emulsifying agents of the ionic or non-ionic type, for example those of the type described above. When desired, the emulsions of the sulphonylcarbamic esters may be used in the form of self-emulsifying concentrates containing the active substances dissolved in the emulsifying agents or in solvents containing emulsifying agents compatible with the active esters, the simple addition of water to such concentrates producing compositions ready for use. Liquid compositions are prepared by dissolving, suspending or emulsifying the sulphonylcarbamic esters of formula I in liquid media. Liquid compositions may also take the form of aqueous solutions of water-soluble salts of the sulphonylcarbamic esters of formula I with or without a wetting agent, and these compositions have proved especially convenient to use.

Herbicidal compositions in the form of aerosols containing one or more of the sulphonylcarbamic esters of the formula I are also within the scope of the present invention.

Any of the foregoing compositions may additionally contain adhesives or other conventional additives.

The herbicidal compositions may also contain, if desired, other herbicidally active compounds such as MCPB [γ-(4-chloro-2-methylphenoxy)butyric acid], 2,4-DB[γ - (2,4 - dichlorophenoxy)butyric acid], MCPA (4 - chloro - 2 - methyl-phenoxyacetic acid), 2,4-D(2,4-dichlorophenoxyacetic acid), 2,4,5 - T(2,4,5 - trichlorophenoxy acetic acid), 4-hydroxy-3,5-dibromo- and 3,5-diiodo-benzonitriles, phenylcarbamates and ureas, for example propham (isopropyl-N-phenylcarbamate) and chloropropham [isopropyl - N - (3 - chlorophenyl)carbamate], and dalapon (sodium) (sodium α,α-dichloropropionate).

The sulphonylcarbamic esters of general formula I may be prepared by known methods for the preparation of sulphonylcarbamates. (By the term "known methods" is meant methods heretofore used or described in the literature).

Typical methods by which the sulphonylcarbamic esters may be prepared are summarised below. In the formulae which follow X is as hereinbefore defined, X' represents nitro, mono-lower-acylamino, N-methyl-lower-acylamino or methoxycarbonylamino and X" represents a mono-lower-acylamino or N-methyl-lower-acylamino group. When X, X' or X" represents a lower-acylamino or N-methyl-lower-acylamino group, it may, if desired, be hydrolysed to give a primary amino or methylamino group after the desired reaction has been carried out [as will be more fully described under (b)]: such hydrolysis is, of course, necessary where X' or X" contains an acyl group other than the fromyl group in N-methyl-formylamino. The methods in question are:

(a) Reacting a sulphonamide derivative of general formula:

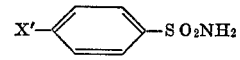
$$\text{II}$$

with methyl chlorocarbonate in an aqueous or organic medium in the presence of a basic condensing agent, preferably at a temperature of from 10–20° C. in aqueous media and at reflux temperature in organic media;

(b) when X represents a primary amino or methylamino group, hydrolysing a compound of general formula:

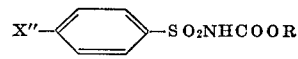
$$\text{III}$$

wherein X" represents a mono-lower-acylamino or N-methyl-lower-acylamino group, preferably a N-methyl-acetamido group, preferably by treatment with an excess of aqueous sodium hydroxide solution at laboratory temperature;

(c) when X represents a primary amino group, catalytically hydrogenating the compound of the formula:

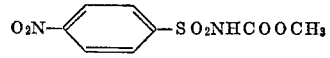
$$\text{IV}$$

in a solvent such as absolute ethanol using Raney nickel or Adams' platinum as catalyst;

(d) when X represents an N-methylformylamino or methoxycarbonylamino group, acylating the corresponding compound in which X represents an N-methylamino or a primary amino group respectively by known methods, for example by treatment with the appropriate halide;

(e) when X representsa methoxy-carbonylamino group, reacting the carbamic ester of the formula:

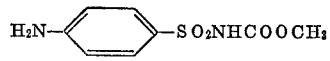
$$\text{V}$$

with methyl chlorocarbonate in an aqueous or organic medium in the presence of a basic condensing agent, preferably at a temperature from 10–20° C. in aqueous media and at reflux temperature in organic media;

(f) when the sulphonylcarbamic ester of formula I is in the form of a water-soluble salt, e.g. an alkali metal derivative, treating the compound of formula I with a stoichiometric quantity of an appropriate base, e.g. an alkali metal or alkali metal alkoxide or hydroxide, in a suitable solvent; preferably the reaction is carried out by treating the ester of formula I with an alkali metal, preferably sodium, dissolved in an excess of a lower aliphatic alcohol, such as methanol, and evaporating to dryness; the potassium salts are especially easy to prepare since they are readily isolated from their aqueous solutions by salting out with potassium chloride; while the product thus obtained is generally contaminated with a small proportion of potassium chloride, it is a simple matter to standardise it to, for example, 75% by weight of active ingredient (calculated as the free acid equivalent) by adding a small calculated amount of potassium chloride. The potassium salt so obtained is stable on long term storage and dissolves readily in water to produce solutions suitable, e.g. for spraying; when an amine salt of the sulphonylcarbamic ester of formula I is desired, the compound of formula I may be treated with a stoichiometric quantity of the amine, for example, diethanolamine, triethanolamine, octylamine or morpholine; when an ammonium salt is required; the sulphonylcarbamic ester of formula I may be treated with gaseous ammonia in a solvent such as methanol or with aqueous ammonium hydroxide.

The sulphonamide starting materials of formula II may be prepared, for example, by the treatment with ammonia of the corresponding sulphonylchloride, which may itself be prepared by, for example, treatment of the corresponding benzene compound with chloro-sulphonic acid or by diazotisation of the appropriate aniline and decomposition of the diazonium compound with cuprous chloride in the presence of sulphur dioxide.

The following Examples illustrate the invention.

EXAMPLE I

A mixture of vermiculite (48 g.), methyl p-aminobenzenesulphonylcarbamate (50 g.), and a condensation product (2 g.) of ethylene oxide (10 moles) and octylphenol (1 mole) is finely ground. The fine wettable powder obtained after being suspended in water, is applied, at a rate of 4 lbs. of active material per acre, and gives satisfactory control of *Alopecurus pratensis* and *Avena fatua* in sugar beet crops before the crop has emerged.

EXAMPLE II

An acetonic solution (20%; 100 cc.) of methyl p-nitrobenzenesulphonylcarbamate is poured dropwise onto Attaclay granules (80 g.), the diameter of which vary from 2 to 5 mm., in a ribbon blender. The solvent is evaporated immediately the solution is added by maintaining the mixture at about 30–40° C. and sweeping the interior of the apparatus with a current of air. The granules are finally dried under reduced pressure at 40–50° C.

The granules obtained are used at a rate of 20 lbs. of granules per acre and give satisfactory control of *Poa annua, Alopecurus pratensis, Chenopodium album, Matricaria inodora* and *Avena fatua* in crops of broad beans before the crop has emerged. The granules may be dispersed over all or part of the surface of the soil.

EXAMPLE III

An emulsifiable concentrate is formed from:

| | G. |
|---|---|
| Methyl p-aminobenzenesulphonylcarbamate | 20 |
| Tween 80 (Polyoxyethylene sorbitan monooleate) | 10 |
| Acetophenone | to 100 |

This concentrate is used at a rate of 3 lbs. of active material per acre, after suitable dilution with water, e.g. 1 part of concentrate to 16 parts of water, and gives satisfactory control of *Avena fatua, Matricaria inodora,* and *Polygonum persicaria* in sugar beet crops before the crop has emerged.

EXAMPLE IV

Methyl p-methylaminobenzenesulphonylcarbamate (100 g.) is mixed with Texofor FX85 (a polyoxyethylene-alkyl phenol condensate) (3 g.). Distilled water is added to give a total volume of 500 mls., which is then ground in a ball-mill for two hours. The resultant suspension is diluted with water to give a suspension which is sprayed at a rate of 2 lbs. of active material per acre on crops of cotton infested with *Eleusine indica* and gives satisfactory control of this weed.

EXAMPLE V

A sprayable suspension in oil of methyl p-methoxycarbonylaminobenzenesulphonylcarbamate is prepared by dissolving the active material in isophorone to give a 20% solution into which is incorporated 5% w./v. of Tween 80. This concentrate (2 parts) is mixed with tractor vaporizing oil (18 parts) to give an oil suspension which is sprayed at a rate of 4 lbs. of active material per acre and gives satisfactory control of perennial grasses such as *Agrostis stolonifera*.

EXAMPLE VI

An emulsifiable concentrate is formed from:

| | G. |
|---|---|
| Methyl p-aminobenzenesulphonylcarbamate | 20 |
| 2,4-Dichlorophenoxybutyric acid (butyl ester) | 8 |
| Tween 80 | 10 |
| Acetophenone to 100 cc. | |

This concentrate is used at a rate of 4.2 lbs. of active material (3 lbs. carbamate, 1.2 lbs. 2,4-dichlorophenoxybutyric acid butyl ester) per acre after suitable dilution in water, e.g. 30 gallons of solution per acre, to give satisfactory control of *Avena fatua, Sonchus* species, *Cirsium arvense, Chenopodium album* and *Sinapis arvensis* in crops of lucerne after emergence of the crop.

EXAMPLE VII

An emulsifiable concentrate is formed from:

| | G. |
|---|---|
| Methyl p-methylaminobenzenesulphonylcarbamate | 20 |
| Tween 80 | 10 |
| Acetophenone to 100 cc. | |

This concentrate is used at a rate of 4 lbs. of active material per acre, after suitable dilution with water, e.g. 1 part of concentrate to 20 parts of water, and gives satisfactory control of *Sinapis arvensis, Matricaria inodora, Avena fatua* and *Alopecurus pratensis* in crops of peas before emergence of the crop.

EXAMPLE VIII

A wettable powder is formed by intimately mixing methyl p - N-methyl-formylaminobenzenesulphonylcarbamate (50 g.), kaolin (40 g.) and Pentrone T (an anionic wetting agent of the sulphonated alcohol type) (10 g.). This powder is used, at a rate of 4 lbs. of active material per acre, after being suspended in water at a suitable concentration, e.g. 8 lbs. of wettable powder to 100 gallons of water, and gives satisfactory control of *Sinapis arvensis, Avena fatua, Alopecurus pratensis* in crops of peas by application before emergence of the crop.

EXAMPLE IX

An acetonic solution of methyl p-N-methylformylaminobenzenesulphonylcarbamate (20%; 100 cc.) is poured drop-wise onto Attaclay granules (80 g.), the diameter of which vary from 2 to 5 mm., in a ribbon-blender. The solvent is evaporated immediately the solution is added by maintaining the mixture at about 30–40° C. and sweeping the interior of the apparatus with a current of air. The granules are finally dried under reduced pressure at 40–50° C.

The granules obtained are used at a rate of 20 lbs. of granules per acre and give satisfactory control of *Avena fatua, Alopecurus pratensis* and *Sinapis arvensis* in crops of peas by application before emergence of the crop.

EXAMPLE X

Methyl *para*-aminobenzenesulphonylcarbamate was formulated as a wettable powder consisting of the free acid (80 g.), a finely divided aluminium silicate (Celite PF; 15 g.), and a sulphonated alcohol anionic wetting agent (Pentrone T; 5 g.). The components were intimately mixed, and the composition so obtained can be used as an aqueous spray in the control of weeds in sugar-cane plantations by application after emergence of the crop.

EXAMPLE XI

The potassium salt of methyl p-aminobenzenesulphonylcarbamate is dissolved in water and sprayed at a rate of 2 lbs. of active material per acre in 10 gallons of spray solution on crops of linseed infested with *Avena fatua, Polygonum scabrum* and *Thalaspi arvense* and gives satisfactory control of these weeds.

EXAMPLE XII

The potassium salt of methyl p-aminobenzenesulphonylcarbamate is dissolved in water and sprayed at a rate of 4 lbs. of active material per acre in 30 gallons of spray solution on established *Rumex crispus* in apple orchards and gives satisfactory control of this weed.

EXAMPLE XIII

The potassium salt of methyl p-methoxycarbonylaminobenzenesulphonylcarbamate is dissolved in water and sprayed at a rate of 4 lbs. of active material per acre in 20 gallons of spray solution on pasture to improve its quality by controlling *Rumex* species and *Agrostis stolonifera*.

EXAMPLE XIV

The potassium salt of methyl p-aminobenzenesulphonylcarbamate is dissolved in water and sprayed at a rate of 4 lbs. of active material per acre in 20 gallons of spray solution on crops of emerged lucerne to give satisfactory control of *Polygonum persicaria* and *Rumex obtusifolius*.

EXAMPLE XV

Methyl N - methylformylaminobenzenesulphonylcarbamate (80 g.), a finely divided aluminium silicate (Celite PF; 15 g.) and a sulphonated alcohol anionic wetting agent (Pentrone T; 5 g.) are formulated as a wettable powder by mixing intimately. The composition so obtained can be applied as an aqueous spray at a rate of 4 lbs. of active material per acre in 20 gallons of spray solution to crops of emerged soya bean or tobacco to give satisfactory control of *Eleusine indica* and *Digitaria sanguinalis*.

Similar weed control is obtained by using a spray obtained by dissolving the potassium salt of methyl p-methylaminobenzenesulphonylcarbamate in water.

EXAMPLE XVI

A granular composition was prepared as described in Example II replacing the methyl p-nitrobenzenesulphonylcarbamate by methyl p-aminobenzenesulphonylcarbamate. The composition was applied at a rate of 20 lbs. of granules per acre by inter-row placement in sugar-cane plantations and gave good control of *Sporobulus indicus*, *Phyllanthus niruri*, *Euphorbia* species, *Widelia gracilis*, *Cynodon dactylon*, and *Physalis* species.

EXAMPLE XVII

A 40% w./v. aqueous solution of the sodium salt of methyl *para*-aminobenzenesulphonylcarbamate was diluted with water and applied at a rate of 4 lbs. of active material per acre in 20 gallons of spray solution to the fully-open fronds of *Pteridium aquilinum* (bracken) growing in pasture and in stands of young pine trees to control the bracken without permanent deleterious effect upon the pasture and young trees.

EXAMPLE XVIII

A 60% w./v. aqueous solution of the sodium salt of methyl *para*-aminobenzenesulphonylcarbamate was diluted with water and applied at a rate of 3 lbs. of active material per acre in 20 gallons of spray solution to established plants of *Sorghum halepense* (Johnsongrass) in an emerged crop of sugar cane. Six weeks after application the control of Johnsongrass was better than 85% (of emerged shoots) and good control was found to exist six months after application. There were no visible signs of injury to the sugar cane.

EXAMPLE XIX

A 60% w./v. aqueous solution of the sodium salt of methyl *para*-aminobenzenesulphonylcarbamate was diluted with water and applied at a rate of 2 lbs. of active material per acre in 40 gallons of spray solution to stands of *Panicum adspersum* varying in growth stage from just emerged seedlings to plants 2½ inches high in an emerged crop of sugar cane 12 to 18 inches high. Good control of *Panicum adspersum* was obtained as shown by examination 5 months after application when the population of *Panicum adspersum* averaged 4% in treated plots as compared with 31% in untreated control plots. No visible change to the sugar cane could be observed.

The compounds used in the invention may be prepared as follows:

PROCEDURE A p-Nitrobenzenesulphonamide (303 g.) is dissolved in aqueous 5% sodium hydroxide solution (1.2 litres). The stirred solution is maintained at 15–20° C. by external cooling while methyl chloroformate (486 g.) is introduced, drop-wise, with simultaneous drop-wise addition of aqueous 10% sodium hydroxide solution so as to maintain the pH of the mixture at 10–11. When the addition is complete, stirring is continued for a further 15 minutes. Hydrochloric acid is then added until the pH of the mixture is 8 and unchanged p-nitrobenzenesulphonamide is filtered off. The filtrate is then made strongly acid with hydrochloric acid, giving methyl p-nitrobenzenesulphonylcarbamate (296 g.) as a white solid, m.p. 145–148° C.

PROCEDURE B

Methyl chloroformate (1.14 kg.) is slowly added to a stirred mixture of $N^4$-acetsulphanilamide (2.14 kg.), anhydrous potassium carbonate (1.75 kg.) and acetone (16 litres). The mixture is stirred and refluxed for 18 hours and the cooled mixture filtered. The solid is taken up in water and acidification of the solution with hydrochloric acid gives crude methyl p-acetamidobenzenesulphonylcarbamate, which is purified by dissolving in an aqueous sodium bicarbonate solution followed by acidification of the filtered solution with hydrochloric acid, giving pure methyl p-acetamidobenzenesulphonylcarbamate (1.25 kg.) as a white solid, m.p. 235–237° C.

The methyl p - acetamidobenzenesulphonylcarbamate (572 g.) obtained above is dissolved in aqueous 2N sodium hydroxide solution and, after standing at laboratory temperature for two days, the solution is acidified with concentrated hydrochloric acid. The precipitated solid is filtered off and to the filtrate are added the liquors obtained by the extraction of the solid with 2N hydrochloric acid until no more will dissolve [the material which is insoluble in hydrochloric acid is unchanged methyl p-acetamidobenzenesulphonylcarbamate (218 g.)]. The pH of the solution is then brought to 4 by the addition of 50% aqueous sodium hydroxide solution, giving methyl p-aminobenzenesulphonylcarbamate (289 g.) as a white solid, m.p. 145–146° C.

PROCEDURE C

N-methylformanilide (81 g.) is added slowly, drop-wise, to stirred chlorosulphonic acid (600 cc.), maintained at −5° C. by external cooling. When the addition is complete, the mixture is maintained at 60° C. for 2 hours and then added to crushed ice (1.2 kg.). The insoluble material is taken up in chloroform and the solution dried over calcium chloride. Removal of the solvent gives p-N-methylformylaminobenzenesulphonylchloride (119 g.) as a yellow solid, m.p. 59–60° C., which is dissolved in benzene (600 cc.). Gaseous ammonia is passed into the ice-cooled solution for two hours. The solution is then filtered and the solid product triturated with water to remove ammonium chloride, giving p-N-methylformylaminobenzenesulphonamide (98.5 g.), m.p. 139–141° C.

Methyl chloroformate (23 cc.) is added slowly to a stirred mixture of p-N-methylformylaminobenzenesulphonamide (42.8 g.), anhydrous potassium carbonate (35 g.) and acetone (350 cc.). The mixture is then stirred and refluxed for 18 hours. The cooled mixture is filtered and the solid taken up in water. Acidification of the solution with hydrochloric acid gives crude methyl p-N-methylformylaminobenzenesulphonylcarbamate, a solution of which in aqueous sodium bicarbonate is filtered and then acidified with hydrochloric acid to give pure methyl p-N-methylformylaminobenzenesulphonylcarbamate (25.5 g.) as a white solid, m.p. 203–205° C.

PROCEDURE D

Methyl p-N-methylformylaminobenzenesulphonamide (prepared as described in Procedure C) (13.4 g.) is dissolved in aqueous 2 N sodium hydroxide solution (60 cc.). After standing at laboratory temperature for two days, the solution is acidified with concentrated hydrochloric acid. The precipitated solid is filtered off and to the filtrate are added the liquors obtained by the extraction of the solid with 2 N hydrochloric acid until no more will dissolve (the material which is insoluble in hydrochloric acid is unchanged methyl p-N-methylformylaminobenzenesulphonamide). The pH of the solution is then brought to 4 by the addition of 50% aqueous sodium hydroxide solution which gives methyl p-methylaminobenzenesulphonylcarbamate (10.5 g.) as a white solid, m.p. 132–134° C.

PROCEDURE E

Proceeding as in Procedure C but commencing with p-N-methylacetylaminobenzenesulphonamide (prepared according to Hassan and Srivasta, Curr. Sci. 1945, 14, 107) (18 g.), methyl chloroformate (10 cc.), anhydrous potassium carbonate (15 g.) and acetone (150 cc.), methyl p-N-methylacetylaminobenzenesulphonylcarbamate (10 g.) is obtained as a white solid, m.p. 184–185° C.

Methyl p-N-methylacetylaminobenzenesulphonylcarbamate (0.7 g.) is treated with 2 N aqueous sodium hydroxide solution (4 cc.), in the manner described in Procedure I, giving p-methylaminobenzenesulphonylcarbamate (0.4 g.) as a white solid, m.p. 132–134° C.

PROCEDURE F

Methyl p-aminobenzenesulphonylcarbamate (920 g.) (prepared as described in Procedure B) is gradually added, with stirring, to a suspension of potassium bicarbonate (400 g.) in water (1 litre), the addition being regulated in a manner such that the frothing which occurs is kept under control. The mixture is then stirred overnight and the slurry obtained is filtered off. After drying at about 50° C., the potassium salt of methyl p-aminobenzenesulphonylcarbamate is obtained as a white solid (690 g.) (analysis: found K=14.7%, N=10.4%; required for $C_8H_9KN_2O_4S$; K=14.6%, N=10.4%).

PROCEDURE G

Methyl p-nitrobenzenesulphonylcarbamate (2.6 kg.) (prepared as described in Procedure A) is added, with stirring, to a solution of anhydrous potassium carbonate (690 g.) in water (5 litres), the addition being made as rapidly as the effervescence allows. The reaction mixture is brought to 25° C. and filtered through "Hyflo." Ground potassium chloride (116 g.) is added to the filtrate and the mixture stirred for half an hour. The solid is filtered off, sucked dry on the filter, air-dried overnight and finally dried to constant weight at 40–50° C., giving the potassium salt of methyl p-nitrobenzenesulphonylcarbamate (with some potassium chloride) as a yellow crystalline solid [2562 g.; assay=96%; chloride ion content=1.22%; nitrogen content=9.2% (the pure potassium salt of methyl p-nitrobenzenesulphonylcarbamate theoretically contains 9.4%)].

PROCEDURE H

Methyl p-methoxycarbonylaminobenzenesulphonylcarbamate is prepared as follows. Methyl chloroformate (14.5 g.) is aded portionwise to a mixture of sulphanilamide (26 g.), diethylaniline (22.5 g.) and methanol (260 cc.). When the exothermic reaction has subsided, the solution is refluxed on a steam-bath for 30 minutes and then added to an excess of 2 N hydrochloric acid. The precipitated solid is collected and treated with excess aqueous sodium bicarbonate solution. Filtration and acidification of the filtrate with hydrochloric acid gives crude methyl p-methoxycarbonylaminobenzenesulphonylcarbamate (6 g.), the material insoluble in aqueous sodium bicarbonate solution being 4-methoxycarbonylaminobenzenesulphonamide (29 g.). This latter material is then mixed with anhydrous potassium carbonate (23 g.) and acetone (250 ml.) and methylchloroformate (20 ml.) added slowly to the stirred mixture. The mixture is stirred and refluxed for 18 hours, cooled, filtered and the solid material obtained taken up in water. Acidification of the solution with hydrochloric acid gives a further quantity of crude methyl p-methoxycarbonylaminobenzenesulphonylcarbamate, (11 g.). The total amount of crude material obtained was recrystallised from aqueous methanol, giving methyl p-methoxycarbonylaminobenzenesulphonylcarbamate (13 g.) as a white solid, m.p. 217–219° C.

PROCEDURE I

Methyl p-methoxycarbonylaminobenzenesulphonylcarbamate (1.44 kg.) (prepared as described in Procedure H) is stirred at 25° C. with a solution of potassium carbonate (34.5 g.) in water (2.5 litres) until solution is complete. The solution is filtered through "Hyflo" and potassium chloride (200 g.) is gradually introduced with stirring. Crystallisation is induced by seeding and when a considerable amount of crystalline material is present, further potassium chloride (400 g.) is gradually introduced. The mixture is then cooled in ice-water with stirring for 1 hour. The product is collected by filtration, sucked dry and air-dried at 40–60° C. giving the potassium salt of methyl p-methoxycarbonylaminobenzenesulphonylcarbamate (1.55 kg.) as a white crystalline solid which contains about 5% of potassium chloride and has a water solubility of about 40%, at 20–25° C.

We claim:

1. A method of controlling the growth of weeds which comprises applying to a locus of weed infestation a herbicidally effective quantity of at least one compound selected from the group consisting of sulphonylcarbamic esters of the formula:

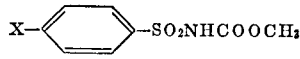

wherein X represents a primary amino, methylamino, N-methyl formylamine, or methoxycarbonylamino, and the herbicidally effective, water-soluble salts thereof.

2. A method according to claim 1, wherein the said sulphonylcarbamic ester is applied in association with a surface-active agent.

3. A method according to claim 1, in which the said herbicidally effective compound is applied at a rate of from 1–10 lbs. per acre.

4. A method according to claim 1 in which the said herbicidally effective compound is applied to a crop of sugar cane.

5. A method according to claim 1 in which the herbicidally effective compound is one in which X is primary amino or methoxycarbonylamino and is applied to an established bush crop.

6. A method according to claim 1 in which the said herbicidally effective compound is one in which X is primary amino and is applied to a crop of sugar cane.

7. A method of controlling the growth of wild oats in linseed by post-emergence application to the crop area of a herbicidal composition containing methyl p-aminobenzene sulphonylcarbamate homogeneously dispersed in at least one compatible diluent suitable for use in herbicidal compositions at a rate sufficient to control the weed without substantial damage to the crop.

8. The method according to claim 1 in which the herbicidally effective compound is applied to a linseed crop after emergence thereof.

9. A method according to claim 4 wherein the said compound is applied to the said crop to control the growth of Sorghum halepense therein.

10. A method according to claim 1 wherein X is amino and the said compound is applied to a stand of timber comprising *Quercus*, to control weed growth therein.

11. A method according to claim 9 wherein the said compound is methyl *p*-aminobenzenesulphonylcarbamate.

12. A method according to claim 4 wherein the said compound is applied to the said crop to control the growth of *Panicum* species therein.

13. A method according to claim 12 wherein the said compound is methyl *p*-aminobenzenesulphonylcarbamate.

14. A method according to claim 1 wherein X is amino and the said compound is applied to a locus which is a non-crop growing area to control the growth of *Sorghum halepense*, therein.

15. A method according to claim 1 wherein X is amino and the said compound is applied to orchards to control the growth of *Rumex* species therein.

16. A method according to claim 1 wherein X is primary amino.

17. A method according to claim 1 wherein X is methyl amino.

18. A method according to claim 1 wherein X is N-methyl-formylamino.

19. A method according to claim 1 wherein X is methoxycarbonylamino.

20. A method according to claim 1 in which X is primary amino or methoxycarbonylamino and is applied to an established orchard crop.

21. A method according to claim 1 wherein X is amino and the said compound is applied to a stand of timber comprising *Picea* to control weed growth therein.

22. A method according to claim 1 wherein X is amino and the said compound is applied to a stand of timber comprising *Abies* to control weed growth therein.

23. A method according to claim 1 wherein X is amino and the said compound is applied to a stand of timber comprising *Pinus* to control weed growth therein.

24. A method according to claim 1 wherein X is amino and the said compound is applied to a locus which is a non-crop growing area to control the growth of *Pteridium aquilinum*.

25. A method according to claim 1 wherein X is amino and the said compound is applied to a locus which is a non-crop growing area to control the growth of *Rumex* species.

26. A method according to claim 1 wherein X is amino and the said compound is applied to pastures to control the growth of *Rumex* species therein.

27. A method according to claim 1 wherein the said herbicidally effective compound is applied to a crop of potatoes.

28. The method according to claim 1 in which the herbicidally effective compound is applied to a lucerne crop after emergence thereof.

29. The method according to claim 1 in which the herbicidally effective compound is applied to a peas crop before emergence thereof.

30. The method according to claim 1 in which the herbicidally effective compound is applied to a French beans crop before the emergence thereof.

31. The method according to claim 1 in which the said herbicidally effective compound is one in which X is primary amino, or methoxycarbonylamino and is applied to a grass crop comprising *Lolium* species.

32. The method according to claim 1 in which the said herbicidally effective compound is one in which X is primary amino, or methoxycarbonylamino and is applied to a grass crop comprising *Festuca* species.

33. The method according to claim 1 for the selective control of undesirable plant growth comprising applying to an area to be protected from such growth a herbicidally effective amount of a compound of the formula:

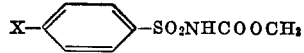

wherein X is primary amino or N-methylformylamino.

34. A method according to claim 1 wherein X is primary amino and the weed is *Digitaria sanguinalis*.

References Cited

UNITED STATES PATENTS

| | | | |
|---|---|---|---|
| 3,498,780 | 3/1970 | Soper et al. | 71—103 |
| 3,512,955 | 5/1970 | Stephens | 71—103 |

JAMES O. THOMAS, Jr., Primary Examiner

UNITED STATES PATENT OFFICE
CERTIFICATE OF CORRECTION

Patent No. 3,823,008      Dated July 9, 1974

Inventor(s) Keith Carpenter et al.

It is certified that error appears in the above-identified patent and that said Letters Patent are hereby corrected as shown below:

Column 1 of the patent, please insert --

-- Foreign Priority: British Application No. 32407/61 filed September 8, 1961 --.

Signed and sealed this 5th day of November 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,823,008      Dated July 9, 1974

Inventor(s) Keith Carpenter et al.

It is certified that error appears in the above-identified patent and that said Letters Patent are hereby corrected as shown below:

Column 1 of the patent, please insert --

-- Foreign Priority: British Application No. 32407/61 filed September 8, 1961 --.

Signed and sealed this 21st day of January 1975.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,823,008          Dated July 9, 1974

Inventor(s) Keith CARPENTER et al

It is certified that error appears in the above-identified patent and that said Letters Patent are hereby corrected as shown below:

| Column | Line | |
|---|---|---|
| 2 | 14 | "peacn" should be -- pecan -- |
| 2 | 57 | "haepense" should be -- halepense -- |
| 2 | 67 | "modiflora" should be -- nodiflora -- |
| 3 | 2 | "charanta" should be -- charantia -- |
| 3 | 18 | "cultvation" should be -- cultivation -- |
| 3 | 59 | "siliata" should be -- ciliata -- |
| 3 | 61 | "Helitropium" should be -- Heliotropium" |
| 4 | 56 | there should be a comma (,) after "mineral" |
| 6 | 11 | "fromyl" should be -- formyl -- |
| 11 | 33 | "methyl" should be inserted after "giving" |
| 13 | 14 | the comma (,) before "therein" should be deleted |
| 11 | 6 and 15-16 | "sulphonamide" should be -- sulphonylcarbamate -- |

Signed and Sealed this twenty-fifth Day of May 1976

[SEAL]

Attest:

RUTH C. MASON
*Attesting Officer*

C. MARSHALL DANN
*Commissioner of Patents and Trademarks*